US Patent [19] Hayes

[11] 4,324,829
[45] Apr. 13, 1982

[54] LAMINATE FILM STRUCTURES FROM CHLORINATED POLYETHYLENES

[75] Inventor: Ronald J. Hayes, Sarnia, Canada

[73] Assignee: The Dow Chemical Company, Midland, Mich.

[21] Appl. No.: 138,613

[22] Filed: Apr. 9, 1980

Related U.S. Application Data

[63] Continuation-in-part of Ser. No. 946,246, Sep. 27, 1978, abandoned, which is a continuation of Ser. No. 822,130, Aug. 5, 1977, abandoned.

[51] Int. Cl.³ .......................... B32B 7/02; B32B 27/08
[52] U.S. Cl. .................................... 428/215; 428/516; 428/520
[58] Field of Search ............... 428/520, 305, 339, 306, 428/327, 332, 340, 516, 322, 212, 215, 213

[56] References Cited

U.S. PATENT DOCUMENTS 3,126,311  3/1964  FitzHarris .......................... 428/327
3,607,616  9/1968  Barbehenn et al. ............ 428/327 X
3,695,922  10/1972  Chujo et al. ........................ 428/336
4,256,784  3/1981  Gebhardt et al. .............. 428/515 X Primary Examiner—Thomas J. Herbert, Jr.
Attorney, Agent, or Firm—D. R. Howard

[57] ABSTRACT

An easily processable, dimensionally stable laminate film structures which are particularly adopted for use in lining ponds, pits, dams and canals and other systems employed for water handling. More particularly, it is directed to laminate film structures comprising, in generally planar coextensive relationship, (A) a first outer layer of substantially linear chlorinated polyethylene containing from about 25 to about 50 weight percent of chemically combined chlorine, (B) an internal layer of substantially linear chlorinated polyethylene containing from about 5 to about 15 percent by weight of chemically combined chlorine, and (C) a second outer layer of the nature of the first outer layer which second outer layer is disposed adjacent the internal layer and remote from the first outer layer, the first and second outer layers being substantially amorphous and the internal layer being substantially crystalline.

8 Claims, No Drawings

LAMINATE FILM STRUCTURES FROM CHLORINATED POLYETHYLENES

CROSS-REFERENCE TO RELATED APPLICATION

This application is a continuation-in-part of application Ser. No. 946,246, filed Sept. 27, 1978, now abandoned which in turn is a continuation of Application Ser. No. 822,130, filed Aug. 5, 1977, now abandoned.

BACKGROUND OF THE INVENTION

In water conservation systems wherein irrigation canals and ditches are utilized for conveying water, it is essential that the surface of the pond, canal or ditch be covered so as to prevent loss of water by drainage or seepage which would otherwise occur through the soil. Application of such covering material to prevent erosion of soil may also be desirable in some instances. Further it is also desirable to provide protective linings for pits, ponds or lagoons containing chemicals such as acids, bases or brines and for structures such as dams.

To that end, one expedient heretofore employed has been cement concrete lining in a layer of about 3 inch/7.6 cm thickness. Another material that has been used for this purpose is so-called asphalt plank which comprises sheets or boards, about ½ inch/1.25 cm thick, formed from wood or other cellulosic fiber and saturated with asphalt. Both of these lining materials are relatively costly and entail a somewhat cumbersome procedure for application and use.

Another lining material used for this purpose is prepared from a film or sheet of a solid chlorinated olefin polymer prepared by the suspension chlorination of an olefin polymer, such as polyethylene, having a substantially linear structure. This material is disclosed in Canadian Pat. No. 833,665. Such materials, however, suffer from deficiencies in dimensional stability, i.e., resistance to shrinkage when exposed to high temperatures for prolonged periods of time, and further fail to provide optimum strength and flexibility as measured by modulus and elongation as well as tensile and tear strengths. As a means of overcoming such deficiencies, laminate films structures have been utilized comprising opposed outer layers of such chlorinated polyolefin materials, e.g., chlorinated polyethylene, in conjunction with an internal layer of polyethylene. Such structures have also failed to provide required dimensional stability in combination with desired modulus, elongation, tensile strength and resistance to tear and delamination. A comparison of the data set forth in Table II hereinafter illustrates the problems inherent in such prior known materials and the advantages obtainable by practice of the present invention. As an alternate means of overcoming the aforementioned deficiencies, laminate film structures have been utilized comprising opposed outer layers of such chlorinated polyolefin materials, e.g., chlorinated polyethylene, in conjunction with an internal layer of fabric. Such structures are subject to delamination because the fabric at the unsealed edges of the laminate tends to act as a wick to draw moisture into the laminate. A further shortcoming of the fabric reinforced laminates is that they lack dimensional yield and are therefore subject to failure or separation at joints or welds upon application of lateral stress.

SUMMARY OF THE INVENTION

Laminate film structures having significantly improved processability, dimensional stability, modulus, elongation, tensile strength and resistance to tear and delamination, and which are thus particularly adapted for use in water-handling systems, are obtained by forming, in generally planar coextensive relationship, (A) a substantially amorphous first outer layer of substantially linear polyethylene containing from about 25 to about 50 weight percent of chemically combined chlorine, such layer having a thickness of from about 0.005 to about 0.05 of an inch; (B) a substantially crystalline internal layer of substantially linear polyethylene containing from about 5 to about 15 percent by weight of chemically combined chlorine and having a thickness of from about 0.005 to about 0.03 of an inch; and (C) a substantially amorphous second outer layer of the nature of the first outer layer, such second outer layer being disposed adjacent to the internal layer and remote from the first outer layer. Composite structures utilizing such laminate film structures are also contemplated, e.g., structures comprising two or more of the herein-specified laminate film structures joined together or composite structures comprising the described film laminate structures in combination with various additional layers of thermoplastic and/or reinforcing materials.

DESCRIPTION OF THE PREFERRED EMBODIMENTS

The substantially linear chlorinated olefin polymer used as the outer layers of the laminate film structures of the present invention is prepared by the chlorinated, preferably while in suspension in an inert diluent, of polyethylene or interpolymers containing at least about 90 mole percent of ethylene in the polymer molecule with any remainder being one or more ethylenically unsaturated comonomers. Such polymers are preferably of an essentially linear structure and have a molecular weight less than about 1,000,000, and preferably a molecular weight of from about 20,000 to 300,000. Such chlorinated olefin polymers may contain from about 25 to 50, and preferably between about 35 to 45, weight percent of chemically combined chlorine and are further characterized by having a relative crystallinity of between about 15 and 28 weight percent and at heat of fusion of less than about 8 calories/gram when containing about 25 weight percent chlorine and a relative crystallinity of less than about 10 weight percent and a heat of fusion of less than about 3 calories/gram when containing about 34 or more weight percent of chlorine, wherein said relative crystallinity is a measure of the ratio of the crystalline peak areas to the sum of the amorphous plus crystalline peak area as determined by conventional X-ray diffraction techniques.

Particularly preferred techniques for preparing such chlorinated olefin polymers are set forth in U.S. Pat. No. 3,454,544, the teachings of which are incorporated herein by reference thereto. The film or sheet structure prepared from such material has a thickness of from about 0.01 to about 0.05 of an inch, a tensile strength of at least about 1100 psi, an elongation of between about 350 and about 900 weight percent and a 100 weight percent modulus of between about 150 and 1500 psi. Film or sheets of this type are disclosed in U.S. Pat. No. 3,399,091.

The substantially linear chlorinated high density olefin polymer used in the preparation of the internal film layer of the laminate film structures of the present invention is preferably prepared from normally extrudable olefin polymer in free flowing powder or particulate form, said polymer being characterized by having a flowability, measured as an angle of repose, of from about 24° to about 28°; a bulk density in the range of from about 25 to about 35 pound/cubic foot; and a surface area in the range of from about 2 to about 4 square meters/gram. Further, the individual particles of such olefin polymer powder preferably have particle sizes predominantly in the range from about 300 to about 600 microns and have a porosity sufficient to provide an average free volume within individual particles in the range of from about 20 to about 45 volume percent based on total particle volume. The internal film layer is further characterized by having a relative crystallinity of greater than 45 weight percent and a heat of fusion of from about 20 to about 40 calories/gram depending upon its chlorine content and the heat of fusion and relative crystallinity of the polyethylene from which it was derived.

For purposes of this invention, the term olefin polymer, as directed to the prescribed internal layer, means homopolymers of ethylene and copolymers thereof containing up to about 5 weight percent of aliphatic, hydrocarbon a-monoolefin such as propylene-1 and butene-1. Preferred olefin polymers are polyethylenes having absolute densities in the range from about 0.90 to about 0.97 g/cc, especially from about 0.950 to about 0.967 g/cc, and melt indexes as determined by ASTM D-1238-64T(E) in the range from about 0.01 to about 40 decigrams/minute, especially from about 0.1 to about 10 decigrams/minute. Preferred heterogeneous techniques or systems for preparing the chlorinated derivatives of such olefin polymers are set forth in U.S. Pat. No. 4,029,862, the teachings of which are incorporated herein by reference thereto. Other heterogeneous systems, i.e., water slurry or other suspension in the absence of solvating effects, may also be used to chlorinate the olefin polymer to a level of from about 5 to about 15 weight percent of chemically combined chlorine at a temperature not exceeding 90 degrees Centigrade (hereinafter referred to as °C.). When such techniques are used, the resulting product will retain a high level of the initial polyethylene type crystallinity. The film or sheet structure prepared from such material has a thickness of from about 0.001 to about 0.01 of an inch and a tensile yield strength of greater than 1000 psi and an elongation of about 600 weight percent. Useful internal layers may also be prepared, however, from blends of high density polyethylene with conventional chlorinated polyethylenes, e.g., the suspension chlorinated polyethylene, utilized for the preparation of the outer layers of the laminate film structures of this invention, providing the required chlorine content is present in the layers formed from such blends.

It is to be understood that the prescribed chlorinated olefin polymer materials may be blended with conventional additives including fillers, stabilizers, plasticizers, e.g., epoxidized and nonepoxidized oils, flame-retarding agents, and processing aids such as low molecular weight polymers and waxes.

The film or sheet-like materials used to form the laminate structures of the present invention may be prepared by conventional techniques wherein the chlorinated olefin polymer is prepared as described herein and blended with the desired additives substantially in the manner conventionally employed in preparing vinyl chloride polymer and copolymer film and sheeting compositions. Thus, for example, the necessary ingredients may be initially dry blended in a mixer, such as a ribbon blender and subsequently milled, as in a two-roll compounding mill, at roll temperatures between about 240° F./115° C. and 400° F./204° C. until the mixture becomes homogeneous. The blend may then be extruded into film or sheet form and calendered to give the desired thickness.

The laminate structures of the present invention may also be prepared using conventional techniques, e.g., by utilizing a single pass laminator while utilizing a temperature preferably of about 310° F./154° C. and a pressure sufficient to provide for adequate lamination of the individual layers.

The following example, wherein all parts and percentages are by weight, illustrates the present invention.

EXAMPLE

(A) PREPARATION OF THE OUTER LAYERS OF THE LAMINATE STRUCTURE

To 4000 grams of deionized water was added, with stirring, 200 grams of a polyethylene having an essentially linear and unbranched structure (containing less than about 1 methyl group per 100 methylene units), and having a melt index of about 1 and a molecular weight of about 67,000. Such polyethylene had been previously prepared by a process using a catalyst composed of triisobutyl aluminum and titanium tetrachloride. The resulting admixture was then charged to a 1½ gallon/5.67 liter autoclave with 8 grams of calcium chloride; about 0.5 cc of a 70 percent solution of ditertiary butyl peroxide in butanol; and about 10 drops of commercially available wetting agent.

The charge was then chlorinated, in a first chlorination step, under about 30 psi (gauge)/3.04 atm. of chlorine pressure at a temperature of about 90° C. until a chlorine content of about 20 percent was obtained. The charge was then chlorinated in a second suspension chlorination step, at a temperature of about 126° C. until a total chlorine content of about 42 percent was obtained. The chlorination product was then isolated from the dispersion by filtration, washed free of residual hydrochloric acid and dried.

The dried material was then used to prepare the following formulation by dry blending of the designated materials in a Banbury mixer:

| Material | Parts by Weight |
| --- | --- |
| Chlorinated Polyethylene | 100.0 |
| Liquid barium-cadmium stabilizer | 2.0 |
| Phosphite stabilizer | 0.5 |
| Epoxidized oil | 3.0 |
| Antimony oxide | 3.0 |
| Chlorinated polyethylene wax | 2.0 |
| Talc | 10.0 |
| Carbon black | 2.5 |
| Stearic acid | 0.5 |
| Polyethylene wax | 1.0 |

The dry blend was then extruded in sheet form at a temperature of about 375°–400° F./190.5° to 204.4° C. into calender rolls to form an essentially unoriented sheet having a thickness of about 0.015 of an inch/0.038 cm.

The following Table I illustrates various physical properties inherent in the so-formed film material.

TABLE I

| Typical Physical Properties | | |
|---|---|---|
| Ult Tensile Strength | ASTM D-882-61T | 1700-2000 psi/119.5-140.6 kg/cm$^2$ |
| Ult Elongation | " | 600-800% |
| 100% Modulus (Tensile stress @ 100% elongation) | " | 200 psi/1406 kg/cm$^2$ |
| 2% Secant Modulus | " | 750 psi/52.52 kg/cm$^2$ |
| Low Temp. Brittleness | ASTM D-746 | 55° F./12.8° C. |
| Tear Resistance, 20 mil/film 0.05 cm | D-1004-59T | 1.9# Machine Direction 2.1# Cross Direction |
| Water Vapor Transmission Rate | E-96-53T Method E | .26 permeability for 10 mil/0.025 cm .15 permeability for 20 mil/0.05 cm |
| Water Extraction | D-1239-55 (24 hrs @ 73° F./ 22.8° C.) | 0% extraction 4% H$_2$O absorbtion |

(B) PREPARATION OF THE INTERNAL LAYER OF THE LAMINATE STRUCTURE

A polyethylene powder having a bulk density of about 30 lbs/ft$^3$ was obtained by polymerizing ethylene under low pressures, i.e., less than about 30 atmospheres, and a slurry polymerization temperature of less than about 100° in the presence of trialkyl aluminum and a titanium-containing component which had been prepared from titanium tetrachloride and diethyl aluminum monochloride. In preparation of the titanium-containing catalyst, titanium tetrachloride, dissolved in an inert hydrocarbon solvent, was reacted using thorough stirring with diethyl aluminum monochloride also dissolved in inert hydrocarbon solvent in a manner such that the molar ratio of titanium tetrachloride to diethyl aluminum monochloride was at any time prior to reaction of all titanium tetrachloride at least 1; the reaction product was then washed with inert hydrocarbon solvent and filtered to remove hydrocarbon-solvent-soluble impurities; and the washed reaction product activated by adding trialkyl aluminum in amount such that the molar ratio of trialkyl aluminum and titanium-containing reaction product was from about 0.3:1 to about 3:1 in the resulting catalyst. The polymerization mixture was agitated at a rate of about 140 rpm. A polymer product in the form of a slurry was withdrawn from the reactor and the polymer particles thereof recovered (by steam distillation and drying in an air slick). Examination of the polymer particles with an electron scanning micrograph confirmed all of such particles as being generally porous, partially fusing agglomerates of much smaller particles, the agglomerates having rough surfaces. Screen analysis of the polymer particles indicates a particle size distribution in weight percent of total powder at the designated particle size as follows:
1.6-14.3% greater than 540 microns
72.3-87.6% from about 320 to about 540 microns
4.7-20.1% from about 248 to about 320 microns
0.8-3.3% from about 175 to about 248 microns
0.1-0.6% from about 147 to about 175 microns
0.2-1.2% less than about 147 microns.

The high bulk density polyethylene powder was chlorinated by fluidizing such material in a suitable container by passing nitrogen gas through the material, in the substantial absence of oxygen, then adding chlorine to the fluidizing gas. The reaction was conducted at a temperture not exceeding 90° C. for a time sufficient to provide about 8 percent by weight of chemically combined chlorine on the polymer particles.

The chlorinated polyethylene was calendered into film having a thickness of about 0.005 of an inch. Such film was characterized by having a melt index of about 0.14 (decigrams/minute as determined by ASTM D-1238-64T(E) and D-1238-84T); a percent elongation of about 600 (ASTM D-882-61T) and a tensile yield strength of about 3920 psi (ASTM D-1412-62T).

(C) PREPARATION AND EVALUATION OF THE LAMINATE STRUCTURE

The chlorinated polyethylene outer layers (A above) were laminated to the chlorinated polyethylene internal layer (B above) employing a conventional single pass laminator utilizing a temperature of about 310° F./154° C. and a pressure sufficient to produce a laminate structure having a total thickness of about 0.03 of an inch and a width of about 48 inches. This material is hereafter identified as structure "1".

For purposes of comparison, a laminate structure was prepared as described above but wherein the internal layer was prepared from a substantially linear non-chlorinated polyethylene of the type which was chlorinated to prepare the outer layers of (A) above. This material is hereafter identified as structure "2".

For purposes of still further comparison, a sheeting having a thickness of about 0.06 of an inch and a width of about 48 inches was prepared from the chlorinated polyethylene of (A) above. This material was designated as structure "3".

The following Table II sets forth physical property comparisons for structures 1, 2, and 3:

TABLE II

| | FILM STRUCTURE IDENTIFICATION | | |
|---|---|---|---|
| Physical Property | 1 (The Invention) | 2 (For Comparison) | 3 (For Comparison) |
| 100% Modulus (psi) (ASTM D-412-62T) | 600 | 457 | 200 |
| Ultimate Tensile Strength (psi) (ASTM D-412-62T) | 2,309 | 1,764 | 1,200 |
| Tear Strength (lb/in of width) | 245 | 198 | 100 |
| Ply Adhesion (psi) | | | |
| Face | Unable to separate | 3.2-3.8 | Not Applicable |
| Back | 7.2-7.4 | 3.1-3.4 | Not Applicable |
| Dimensional Stability | | | |
| Boiling Water (% shrink after 10 minute immersion) | 0.5 | 2.5 | 4 |
| Circulating Air (% shrink after 12 hours exposure to 212° F./100° C. circulating air) | 1.8 | 2.4 | Not Available |
| Tensile Creep (% creep) (elongation of specimens loaded to 19 psi after 12 hours exposure to 212° F./100° C. circulating air) | 1.25 | 2.5 | Not Available |

The above data clearly illustrate the significantly improved properties achieved by preparation of laminate structures of the present invention. Equally good results as specified above for structure 1 were also obtained by preparation of laminate structures of the composition of structure 1 (using an internal layer having a thickness of about 0.005 of an inch) but varying in total thickness of the laminate structure from about 0.020 to about 0.045 of an inch while varying the width of such structure from about 48 to 61 inches. Further, the laminate structures of the present invention were found to be much easier to process as compared to structures of the composition of structure 2. More specifically, the laminate structures of the present invention provided a production yield of greater than 10 percent, as compared to preparation of structure 2, and were free from irregular edges as commonly observed during the preparation of structure 2 materials. These properties permit the manufacture of laminate structures having significantly greater width as is obtainable with structure 2 type materials, i.e., width up to about 60 inches.

The laminate structures of the present invention have also been found to have excellent resistance to tearing, delamination, and cracking resulting from freeze-thaw cycling and wind and wave action when utilized as a protective lining in newly constructed water containing ponds, including ponds wherein the earth had not been fully consolidated. Such laminate structures have also shown excellent resistance to oils and chemicals when used as a protective lining in ponds, lagoons or ditches used to store or convey such materials.

The laminate structures of this invention are also capable of being easily welded to each other by application of conventional solvents such as methylethyl ketone, toluene and xylene. Such structures may be utilized for lining canals, ditches, ponds and other water handling systems wherein the material in sheets of desired width may be supplied in the form of convoluted rolls to the job site. Thereafter, such sheets can be easily unrolled and cut into desired or required lengths. Individual films or sheets may be welded together, if desired, utilizing conventional solvent welding and/or dielectric welding techniques.

What is claimed is:

1. A laminate film structure comprising, in a planar coextensive relationship, (A) an amorphous first outer layer of linear chlorinated olefin polymer containing from about 25 to about 50 weight percent of chemically combined chlorine and having a thickness of from about 0.005 to about 0.05 of an inch; (B) a crystalline internal layer of linear chlorinated olefin polymer containing from about 5 to about 15 percent by weight of chemically combined chlorine and having a thickness of from about 0.005 to about 0.03 of an inch, said internal layer being a film formed from a linear chlorinated high density olefin polymer, said polymer, in particulate form, having a flowability, measured as angle of repose of from about 24° to about 28°, a bulk density in the range of from about 25 to about 35 pounds/cubic foot, a surface area in the range of from about 2 to about 4 square meters/gram, particles sizes predominantly in the range of from about 300 to about 600 microns and a porosity sufficient to provide an average free volume within individual particles in the range of from about 20 to about 40 volume percent based on total particle volume, said polymer being chlorinated while in particulate form in a heterogeneous system at a temperature of less than about 90° C., said internal layer having a heat of fusion of from about 20 to about 40 calories/gram; and (C) an amorphous second outer layer of the nature of said first outer layer, said second outer layer being disposed ajacent to said internal layer and remote from said first outer layer.

2. The laminate film structure of claim 1 wherein said first and second outer layers are formed from a linear chlorinated olefin polymer having a relative crystallinity of between about 15 and 28 weight percent and a heat of fusion of less than about 8 calorie/gram when containing about 25 weight percent chlorine and a relative crystallinity of less than about 10 weight percent and a heat of fusion of less than about 3 calorie/gram when containing about 34 or more weight percent chlorine, said layers having a tensile strength of at least about 1100 pounds per square inch, an elongation of between about 350 to 900 weight percent and a 100 weight percent modulus of between about 150 and 1500 psi.

3. The laminate film structure of claim 1 wherein said first and second outer layers are formed from a linear chlorinated polyethylene containing about 42 percent of chemically combined chlorine.

4. The laminate structure of claim 3 wherein said internal layer is formed from a linear chlorinated polyethylene containing about 8 percent by weight of chemically combined chlorine.

5. The laminate film structure of claim 4 wherein said internal layer has a thickness of about 0.005 of an inch and said laminate film structure has a total thickness of from about 0.020 to about 0.045 of an inch and a width of up to about 60 inches.

6. A laminate film structure comprising in planar coextensive relationship (A) an amorphous first outer layer of linear olefin polymer containing from about 25 to about 50 weight percent of chemically combined chlorine and having a thickness of from about 0.005 to about 0.05 of an inch, (B) a crystalline internal layer comprising a blend of a high density polyethylene in admixture with a chlorinated polyethylene, said blend containing from about 5 to about 15 percent by weight of chemically combined chlorine, and having a thickness of from about 0.005 to about 0.03 of an inch, and (C) an amorphous second outer layer of the nature of said first outer layer, said second outer layer being disposed adjacent to said internal layer and remote from said first outer layer.

7. The laminate film structure of claim 6 wherein said first and second outer layers are formed from a linear polyethylene containing about 42 percent of chemically combined chlorine.

8. The laminate film structure of claim 7 wherein said internal layer has a thickness of about 0.005 of an inch and said laminate film structure has a total thickness of from about 0.020 to about 0.045 of an inch and a width of up to about 60 inches.

* * * * *